(12) United States Patent
Verniau et al.

(10) Patent No.: US 11,808,662 B2
(45) Date of Patent: Nov. 7, 2023

(54) DEVICE FOR SEALINGLY REPOSITIONING AND COOLING AN AIR FLOW MEASURING ELEMENT WITHIN AN OPERATING TURBOMACHINE

(71) Applicant: Safran Aircraft Engines, Paris (FR)

(72) Inventors: Jean-Luc Verniau, Moissy-Cramayel (FR); Gilles Polo Filisan, Moissy Cramayel (FR); Adnan Sozuan, Moissy-Cramayel (FR); Simon Paris, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 238 days.

(21) Appl. No.: 16/981,815

(22) PCT Filed: Mar. 20, 2019

(86) PCT No.: PCT/FR2019/050641
§ 371 (c)(1),
(2) Date: Sep. 17, 2020

(87) PCT Pub. No.: WO2019/180383
PCT Pub. Date: Sep. 26, 2019

(65) Prior Publication Data
US 2021/0033492 A1    Feb. 4, 2021

(30) Foreign Application Priority Data
Mar. 22, 2018  (FR) ...................................... 1852500

(51) Int. Cl.
*G01M 15/14*    (2006.01)
*F01D 25/28*    (2006.01)
*G01M 9/06*    (2006.01)

(52) U.S. Cl.
CPC ........... *G01M 15/14* (2013.01); *F01D 25/285* (2013.01); *G01M 9/065* (2013.01); *F05D 2260/83* (2013.01)

(58) Field of Classification Search
CPC ..... G01M 15/14; G01M 9/065; F01D 25/285; F05D 2260/83; F05D 2260/12; G01P 1/026; B62D 3/12
See application file for complete search history.

(56) References Cited

U.S. PATENT DOCUMENTS 3,710,816 A * 1/1973 Prince ................... F16K 3/0281
                                                    251/327
4,907,456 A * 3/1990 Rozelle .................. G01H 1/006
                                                    73/866.5
5,076,108 A    12/1991  Trimarchi

FOREIGN PATENT DOCUMENTS

FR    3 036 735 A1    12/2016
FR    3 043 203 A1    5/2017
(Continued)

*Primary Examiner* — Eric S. McCall
*Assistant Examiner* — Timothy P Graves
(74) *Attorney, Agent, or Firm* — BLANK ROME LLP (57) ABSTRACT

A device for measuring the characteristics of an air flow in an annular passage of a turbo-machine. The device includes a rod which extends along a first axis and carries means for measuring air flow characteristics. The rod also sealingly engages and slides in a first tubular part extended by a second tubular part. The second tubular part sealingly passes along the first axis through a slider mounted in a slide for sliding along a second axis perpendicular to the first axis. The rod engages the second tubular part with an annular clearance.

11 Claims, 7 Drawing Sheets

(56) References Cited

FOREIGN PATENT DOCUMENTS

| FR | 3 043 464 | A1 | | 5/2017 | | |
|----|-----------|----|---|--------|---|---|
| FR | 3 051 908 | A1 | | 12/2017 | | |
| FR | 3051908 | A1 | * | 12/2017 | ............. | F01D 17/08 |

* cited by examiner

DEVICE FOR SEALINGLY REPOSITIONING AND COOLING AN AIR FLOW MEASURING ELEMENT WITHIN AN OPERATING TURBOMACHINE

CROSS REFERENCE TO RELATED APPLICATIONS

This application is a national phase of PCT/FR2019/050641, filed Mar. 20, 2019, which claims the benefit of French Application No. 1852500, filed Mar. 22, 2018, the subject matter of each of which are incorporated by reference herein in their entirety.

FIELD OF THE INVENTION

The present invention relates to a device for measuring the characteristics of an air flow in a turbomachine, such as a test turbomachine.

BACKGROUND OF THE INVENTION

Figure 1:
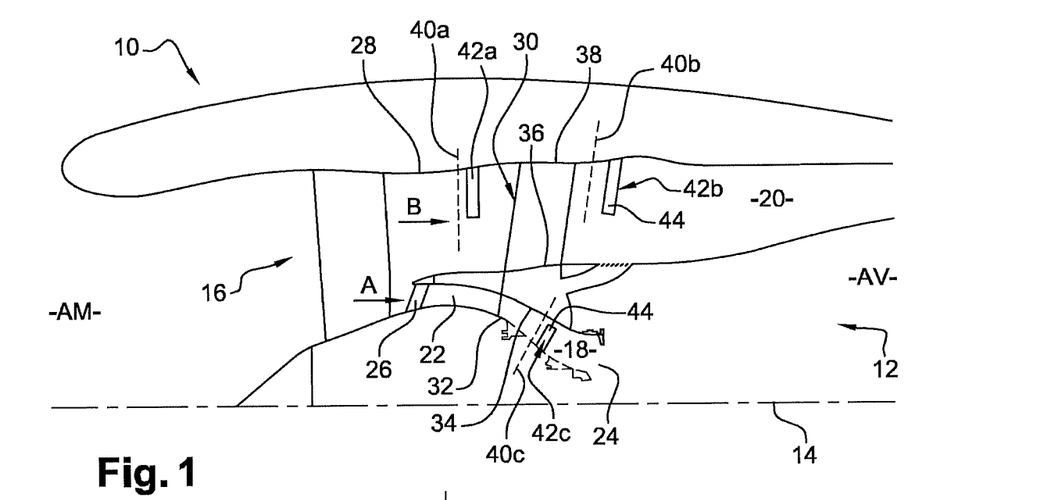
FIG. 1 already described is a cross-sectional axial diagrammatic half-view of an aircraft turbofan of a known type.

Conventionally, a dual-flow turbofan 10, as illustrated in FIG. 1, consists of a gas turbine 12 with a revolution axis 14 driving a ducted fan wheel 16, wherein the latter is generally positioned upstream from the turbofan. The mass of air sucked in by the engine is divided into a primary air flow (arrow A) that flows through the gas turbine 12 or engine core and a secondary air flow (arrow B) originating from the fan 16 and surrounding the engine core, wherein the primary and secondary air flows are concentric and circulate in a primary annular flow passage 18 and a secondary annular flow passage 20 respectively 8.

In a manner well known per se, the primary air flow (arrow A) is generally compressed by a low-pressure compressor 22 and subsequently by a high-pressure compressor 24, each having vanes both fixed 26 and mobile arranged alternatively in the direction of movement of the flow. The low-pressure compressor shaft is connected to the fan wheel 4 and is driven in rotation by the shaft of a low-pressure turbine arranged downstream (not illustrated). The low-pressure compressor shaft is driven in rotation by the shaft of a high-pressure turbine arranged at the outlet of a combustion chamber and located upstream from the low-pressure turbine (both not illustrated).

In a double-body turbofan of this kind, fan casing usually designates the external annular wall 28 surrounding the fan wheel 16 and intermediate casing 30 designates a structural element of the turbomachine interposed axially between the compressors, low-pressure 22 and high-pressure 24, which passes through the annular flow passages, primary 18 and secondary 20. This intermediate casing 30 comprises two annular walls, radially internal 32 and external 34, respectively delimiting, internally and externally, the primary annular air flow passage 18 and two annular walls, radially internal 36 and external 38 delimiting internally and externally the secondary annular flow passage 20, respectively.

Within the context of developing a turbofan, the latter's performances need to be tested with a view to its certification. Development turbomachines are therefore provided for this purpose. A large number of measurements are performed on these turbomachines. The characteristics of the aerodynamic flow in particular are measured at various axial positions or measurement planes 40a, 40b, 40c. In addition, we want to be able to measure at several points in a measurement plan.

For this purpose, measuring elements, commonly known as measurement sensors, arranged on the measurement planes, are generally used to characterise the aerodynamic flow by measuring parameters such as pressure and temperature, for example, during operation. Such a device 42a, 42b, 42c comprises a rod 44 carrying means for measuring air flow characteristics. It also comprises a radially outer end and a radially inner end in relation to the axis of rotation 14 of the turbomachine. The radially outer end of component 42a, 42b, 42c is carried by a casing of the turbomachine, while the radially inner end arranged inside the flow path is free and placed in the air flow of the turbomachine whose air flow characteristics are to be measured.

More specifically, the radially outer end is connected to a housing mounting base to support rod 44 in a given fixed radial direction. When measurements are to be taken at different radial positions, it is necessary to stop the turbomachine, reposition the rod in its base to a different position and restart the turbomachine. These steps prove to be long and complicate the testing phases. Also, at certain rotational speeds of the blower, especially when the rod 44 extends into the annular secondary air stream, the rod 44 is likely to enter into resonance, which can lead to cracks in the measuring rod 44 and can impact its mechanical integrity. In extreme cases, formation of nicks or cracks as a result of the vibrations may cause partial or total dislocation of the rod 44. The debris thus released circulate in the flow passage and may damage components of the turbomachine arranged downstream.

In known systems, it has been proposed, for example, to mount the rod on radially sliding means of movement and on means of movement in a tangential or circumferential direction. However, this type of mounting does not allow for optimal air-tightness of the airflow so that the measurement impacts the characteristics of the airflow it is intended to measure.

The purpose of this invention is in particular to provide a simple, effective and economical solution to the problems of the prior art described above.

SUMMARY OF THE INVENTION

Thus, the invention provides a device for measuring the characteristics of an air flow of an annular stream of a turbomachine, comprising a rod extending along a first given axis, carrying means for measuring the characteristics of an air flow and sealingly slidingly engaged in a first tubular part extending into a second tubular part passing sealingly along the first axis through a slide mounted slidingly in a slide along a second axis perpendicular to said first axis, said rod being engaged with an annular clearance in said second tubular part.

According to the invention, the sealing is carried out at two different places on two different axes of movement of the rod, thus simplifying the design of the measuring device. In particular, a seal is made with respect to the slide via the second tubular part and the seal with respect to the air flowing in the second tubular part is made directly on the rod itself.

A further feature of the invention is that the slide is preferably cylindrical and comprises a first telescopic tube slider part and a second telescopic tube slider part, said first and second telescopic tube slider parts being sealingly attached at one axial end to said second tubular part.

The use of telescopic tube sliders allows the pressure of the air entering through the annular gap between the rod and the second tubular part to be distributed evenly over the individual tubes making up the first and second slider part.

The first tubular part may comprise a first support plate supporting in rotation about the first axis a first actuator for translational displacement of the rod along said first axis.

In order to ensure cooling of the first plate, the latter may comprise a circuit capable of allowing air circulation and intended to be connected to air supply means. The thermal regulation of the first plate thus limits the heating of the parts fixed to it. It is understood that the first plate is preferably also tubular, i.e. it comprises at least one central opening for the passage of the rod.

In a particular configuration, a first tubular part and a second tubular part coaxial to the first axis are mounted around the rod, the first tubular part surrounding the second tubular part and delimiting with the latter a circuit capable of allowing a circulation of a cooling liquid which is intended to be connected to means for supplying cooling liquid. This arrangement, in combination with the cooling air circuit, allows even better temperature control of the device.

Advantageously, the first tubular part is inserted in an opening of the first plate and is made integral with said first plate.

In order to ensure the tight guidance of the rod and to limit the upward movement of hot gases in the first tubular part, the latter can internally house a guide tube in which the rod is mounted with a tight sliding fit.

The guide tube may comprise an annular flange clamped between an annular shoulder at a first end of the second tubular part and a clamping nut screwed to a second end of said second part.

Advantageously, a seal can be mounted around the rod and compressed along said first axis between two rings, said two rings and the seal being interposed between said flange of the guide tube and the nut.

In order to move the second part and the first part along the second axis, the second tubular part is made integral with a second plate mounted for movement along the second axis by means of a rack and pinion system.

A sole can be fixed to a face of the slide opposite that supporting the first tubular part, said sole comprising an opening through which the rod passes and a circuit capable of allowing a cooling liquid to circulate and intended to be connected to means for supplying a cooling fluid.

Advantageously, the slide comprises a circuit capable of allowing air circulation and connected to means of cooling air supply.

The invention also relates to an air flow duct, for a turbomachine, comprising two coaxial inner and outer annular walls, and a device as described above, the slide being fixed to a radially outer face of the outer annular wall and the rod passing through said outer annular wall so that its free end is arranged between said two inner and outer annular walls.

The invention will be better understood and other details, characteristics and advantages of the invention will appear when reading the following description, which is given as a non-limiting example, with reference to the attached drawings.

DETAILED DESCRIPTION

Figure 2:
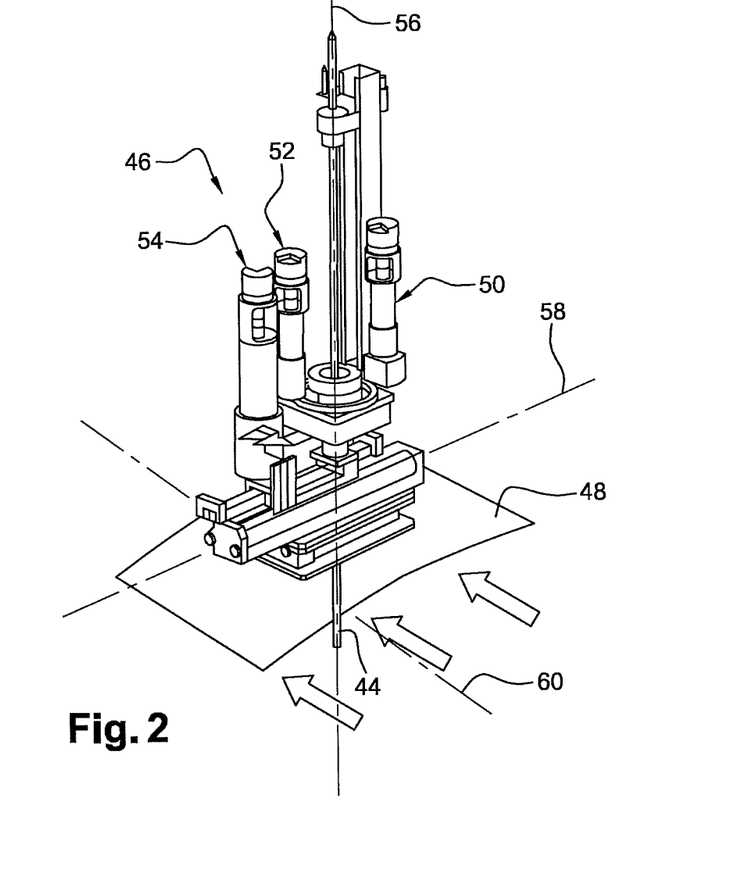
FIG. 2 is a schematic perspective view of a device according to the invention for making measurements of the characteristics of an air flow in an annular air flow path.

FIG. 2 represents a device 46 according to the invention carried by an external casing 48 of the turbomachine and comprising three actuators 50, 52, 54, a first actuator 52 allowing the displacement of the measuring rod 44 along a first axis 56 extending radially, a second actuator 54 allowing the rotational displacement of the rod 44 about said first axis 56 and a third actuator 54 allowing the displacement of the rod 44 along a second axis 58 perpendicular to the first axis 56. The second axis 58 extends in a direction perpendicular to the radial direction which is that of the first axis 56 and perpendicular to the longitudinal direction 60 parallel to the axis 14 of rotation of the turbomachine, with the air flow flowing in one direction the longitudinal direction.

Figure 3:
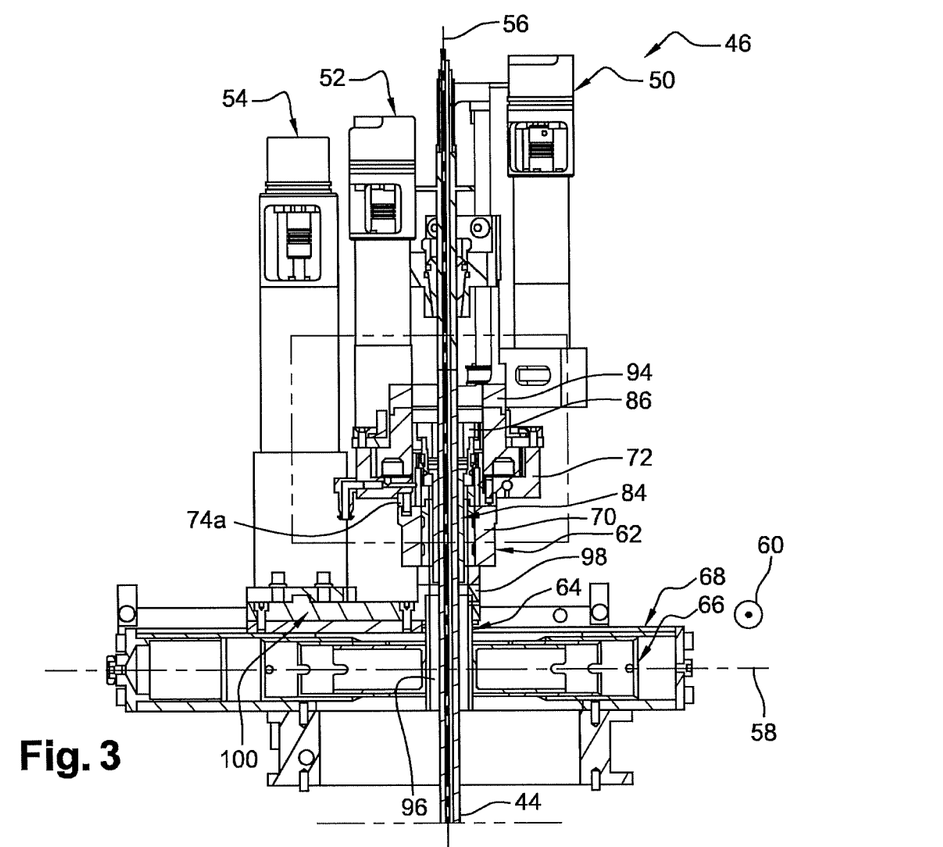
FIG. 3 is a schematic cross-sectional view of the device according to the invention.

FIG. 3 shows device 46 in FIG. 3 in cross-section in a plane comprising the first axis 56 and the second axis 58. The device 46 comprises a first tubular part 62 extending along the first axis 56 and extended by a second tubular part 64 passing sealingly through a cylindrical slider 66 mounted slidingly in a slide 68, the slider 66 being capable of moving along the second axis 58.

Figure 4:
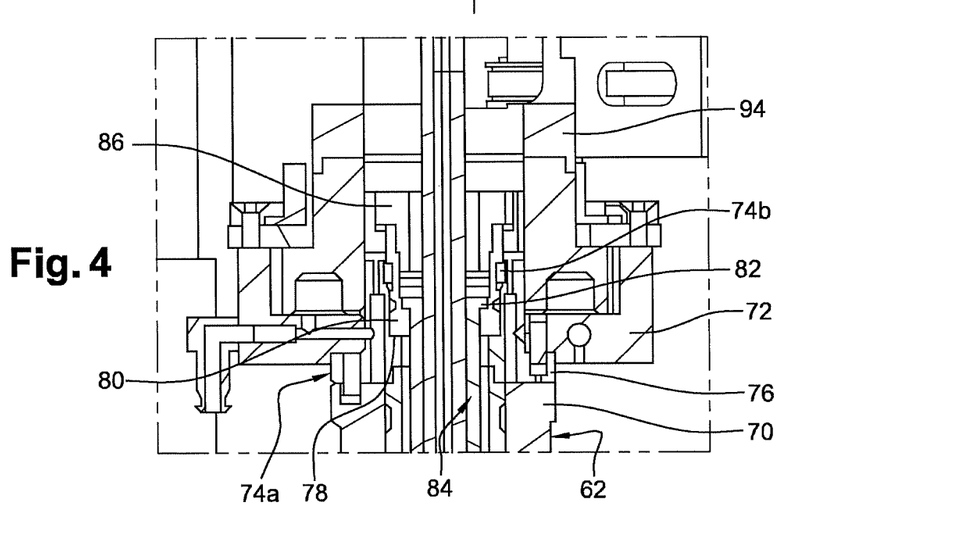
FIG. 4 is a enlarged view of the area enclosed in dotted lines in FIG. 4A.
Figure 5:
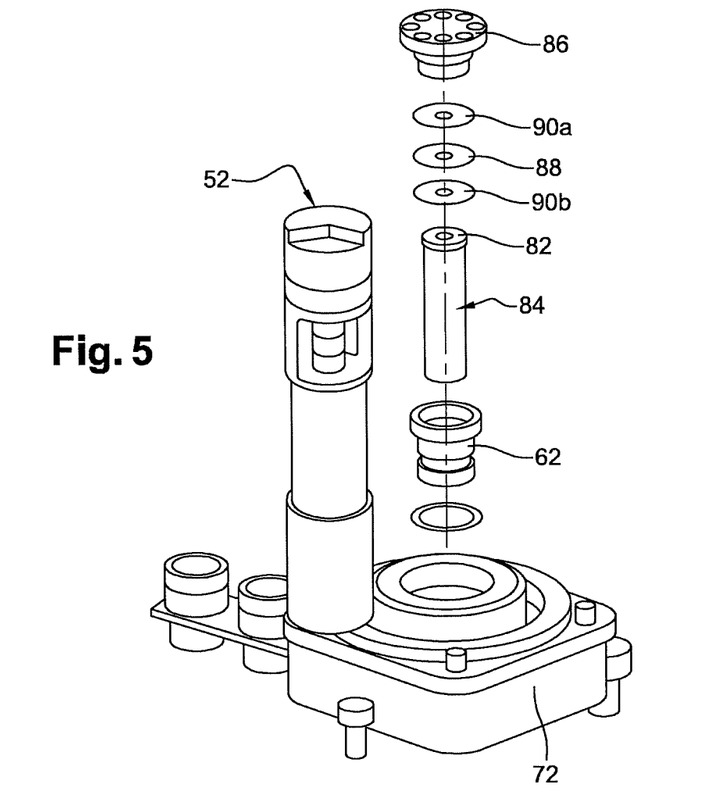
FIG. 5 is a schematic perspective and exploded view of a part of the device according to the invention.

More precisely, the first tubular part 62 comprises a tubular body 70 formed at the radially inner end thereof and made integral with a first plate 72 supporting the measuring rod 44 in translation along the first axis 56 and in rotation about the first axis 56 (FIG. 4). The first plate 72 comprises an opening centred on the first axis 56 and in which are engaged coaxially to the first axis 56 a first tubular part 74*a* and a second tubular part 74*b*, the first tubular part 74*a* surrounding the second tubular part 74*b*. As can be seen in FIG. 4, the first tubular part 74*a* has at its radially inner end an annular flange 76 clamped between tubular body 62 and the first plate 72. Also, the first tubular part 74*a* has a radially inner annular shoulder 78 on which the radially inner end or first end of the second tubular part 74*b* is mounted in radially inward abutment. Likewise, this first end of the second tubular part 74*b* comprises an annular shoulder 80 on which is mounted in radially inward abutment a radial annular flange 82 of a guide tube 84 for sliding the rod 44 in a fitted manner along the first axis 56 and in which the rod 44 is engaged. As can be better seen in FIG. 6, the guide tube 84 is formed in two parts 84*a*, 84*b* in order to allow the guide tube 84 to be mounted around the rod 44 since it comprises the means for measuring the characteristics of the air flow in its radially inner part intended to be mounted inside the duct. Each part 84*a*, 84*b* of pipe 84 comprises a semi-cylindrical portion 85*a*, 85*b* connected at one end to a radial semi-annular flange 82*a*, 82*b*. Flanges 82*a*, 82*b* together define annular flange 82 and the semi-cylindrical portions 85*a*, 85*b* form a cylindrical portion 87. The second end or radially outer end of the second tubular part 74*b* receives a nut 86 allowing the tightening of a joint 88 interposed between two rings 90*a*, 90*b*. Said two rings 90*a*, 90*b*, the seal 88 and the nut 86 are recessed coaxial to the first pin 56 and are mounted around pin 44. The rod 44 is mounted with a close sliding fit, i.e. without play in the guide tube 84, which allows it to slide freely but prevents hot air from rising from the annular air stream.

Figures 6, 7:
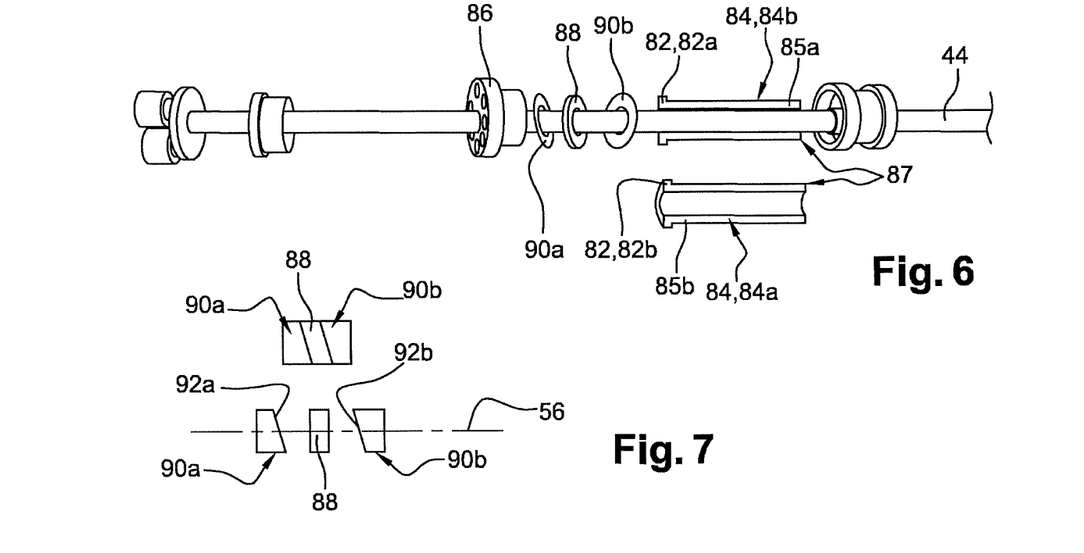
FIG. 6 is a schematic perspective view of the rod and the sealing means allowing the rod to slide in the radial direction.
FIG. 7 is a schematic view showing the crushing of a seal for the sliding rod seal.

As shown in FIG. 7, seal 88 is substantially planar at rest and comprises two substantially planar opposite faces. The two rings 90*a*, 90*b* each have one face 92*a*, 92*b* inclined obliquely to the first axis 56, said two faces 92*a*, 92*b* being inclined in a similar manner, i.e. so that the angle between them is close to zero. This conformation of the rings 90*a*, 90*b* ensures an optimal crushing of the seal 88 and consequently improves the tightness.

The first plate 72 carries a base plate 94 rotatably mounted on the first axis 56. This base plate 94 supports the first actuator 50 carrying the rod 44 and allowing its translation movement in the first tubular part 62. The first plate 72 carries the second actuator 52 allowing base 94 to be rotated about the first axis 56. In this way, the measuring equipment of the measuring rod 44 can be optimally aligned with the direction of air flow in the annular air stream.

Figure 8A:
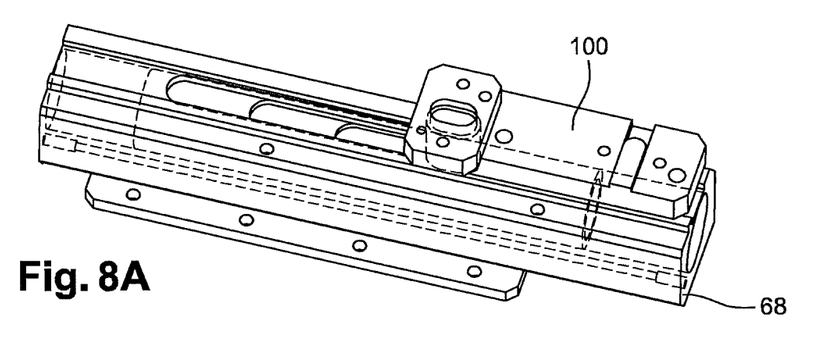
FIGS. 8A, 8B and 8C are schematic views of the means for moving the measurement rod in a tangential direction.
Figure 8B:
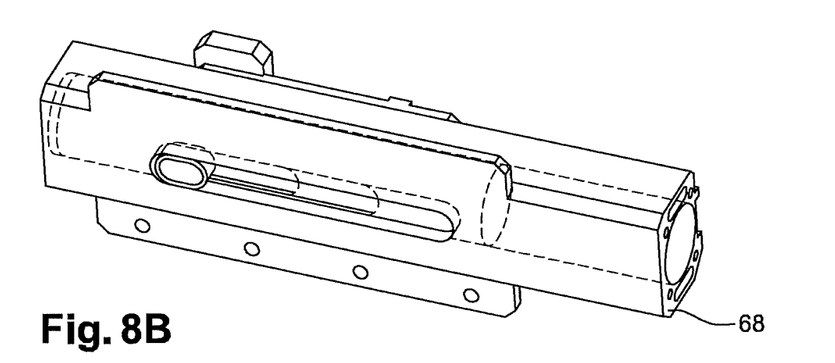
Figure 8C:
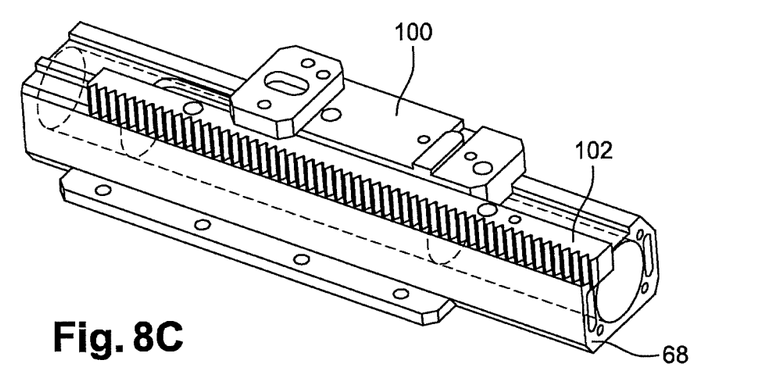
Figure 9A:
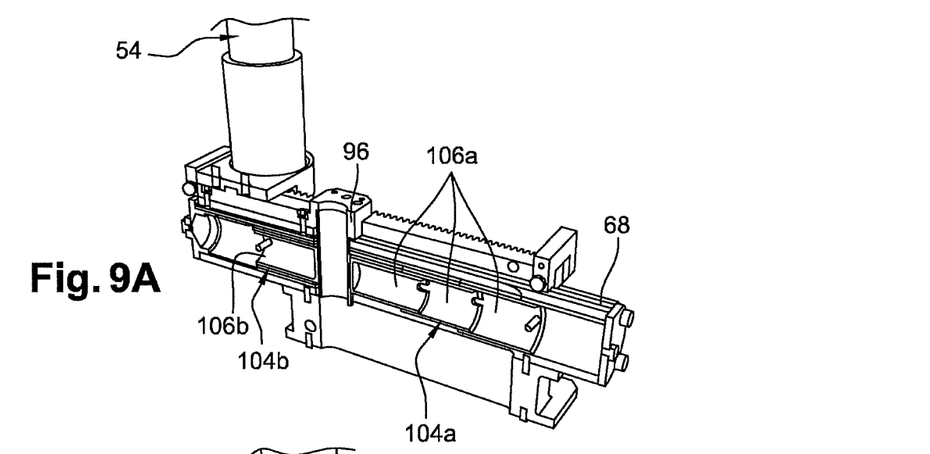
FIGS. 9A, 9B and 9C are schematic longitudinal section views of the slide and the cylindrical slider allowing movement in a tangential direction.
Figure 9B:
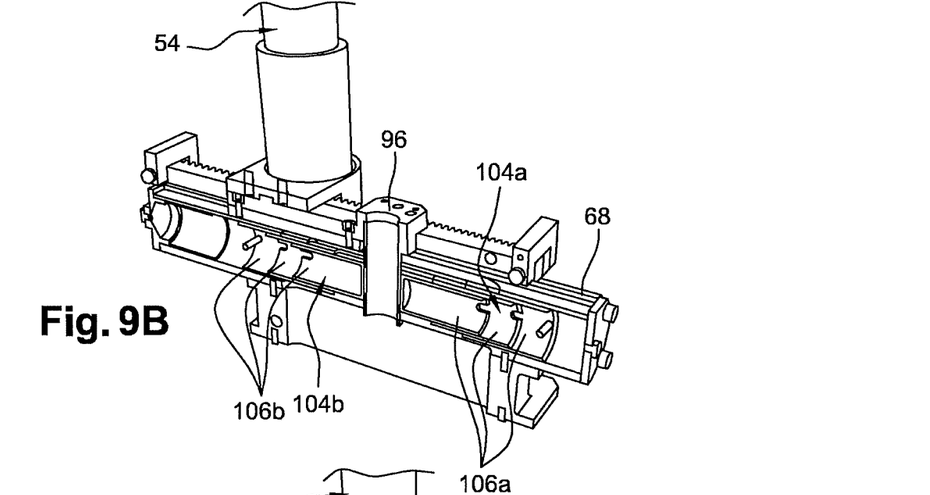
Figure 9C:
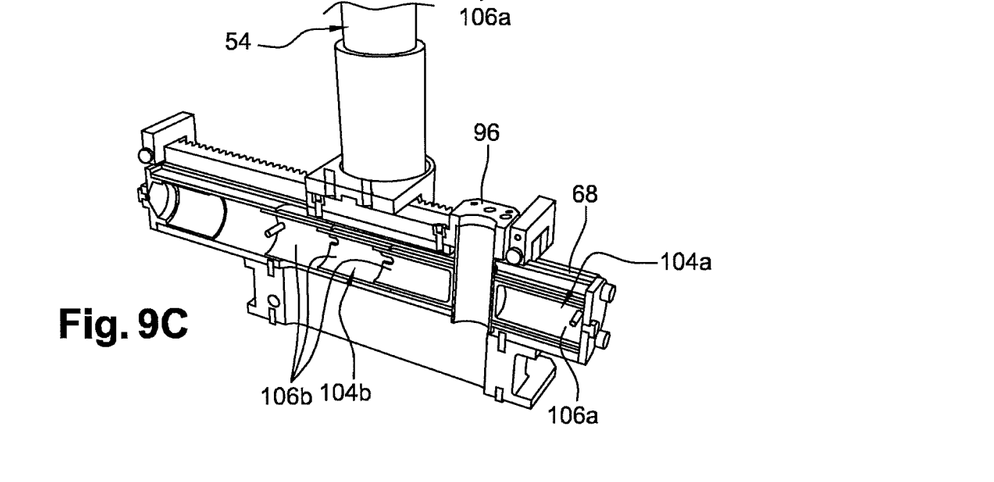

The second tubular portion 64 comprises a tube 96 mounted in a radially outward abutment in a tubular portion 98 of a second plate 100 capable of moving along the second axis 58. This second plate 100 carries the third actuator 54 which allows, by means of a rack and pinion system 102, the movement of the second tubular part 64 along the second axis 58 (FIGS. 8 and 9). The rack and pinion 102 is here carried by slide 68.

Cylindrical slider 66 is mounted in slide 68, which is also cylindrical in shape, and consists of a first slider part 104*a* and a second slider part 104*b* with telescopic cylindrical tubes, i.e. the constituent tubes 106*a*, 106*b* fit and slide into each other. Each slider part 104*a*, 104*b* consists of three tubes 106*a*, 106*b* nested inside each other. The two parts 104*a*, 104*b* of the telescopic tube slider are attached by one end to tube 96 coaxial to the first axis 56 so as to ensure an airtight seal of the annular vein. As can be seen in FIG. 3, tube 96 is dimensioned so that the rod 44 is surrounded with clearance by tube 44. The use of sliders with telescopic tubes has the advantage that the pressure of the annular air stream is better distributed and its impact on the sliding movement of the individual tubes 106*a*, 106*b* of each slider part 104*a*, 104*b* relative to each other is greatly reduced. In one embodiment, tubes 106*a*, 106*b* are machined with a clearance of 8 to 15 µm to guarantee sliding and leak-free operation.

Figures 10A, 10B:
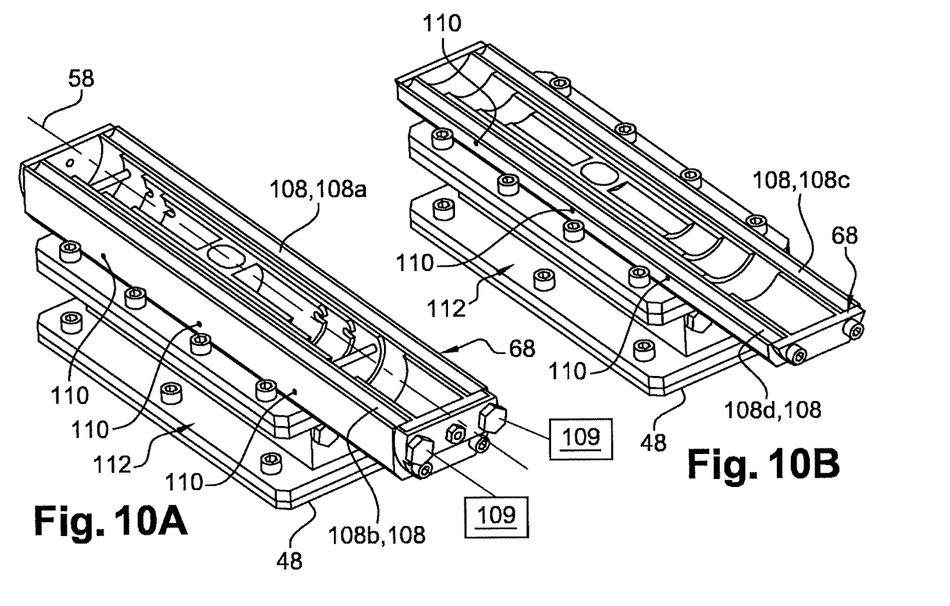
FIGS. 10A, 10B, 11A and 11B are schematic sectional views in a plane perpendicular to a radial direction showing the inside of the slide.

In order to limit the operating temperature rise of the device 46, a first cooling circuit using air (FIGS. 10A and 10B) and a first cooling circuit using a liquid such as water (FIGS. 11A and 11B) are provided. Thus, slide 68 comprises, in its middle part, a first cooling air circuit 108 with four channels 108*a*, 108*b*, 108*c* extending along the second axis 58. In practice, the air circuit consists of two fluidically independent sub-circuits. The first sub-circuit comprises channels 108*a* and 108*c* and the second sub-circuit comprises channels 108*b* and 108*d*. Channels 108*a* and 108*b* are connected at one end to pressurised air supply means 109 and are connected respectively to channels 108*c* and 108*d*, the latter channels being connected to the outside atmosphere through ports 110 formed in slide 68 (FIGS. 10A and 10B). In this way, slide 68 can be cooled during operation.

Figures 11A, 11B:
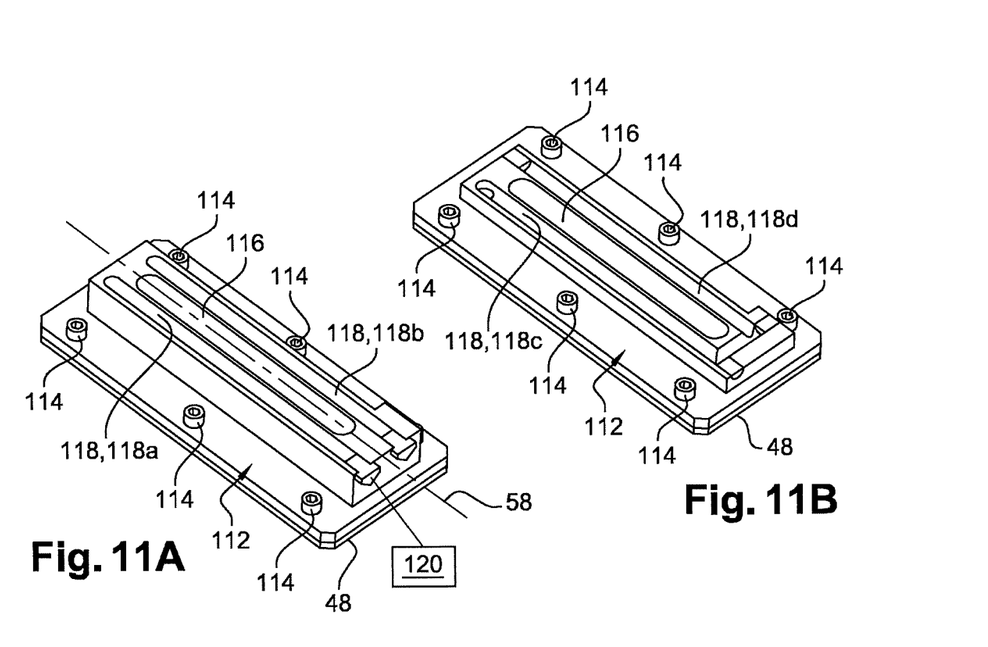

The device 46 according to the invention is integrally supported by a sole 112 for attachment to the housing, whose bolting elements 114 are shown in FIGS. 11A and 11B. This sole 112 includes a central opening 116 allowing the passage of the instrumented rod 44. The first water cooling circuit 118 comprises four channels 118*a*, 118*b*, 118*c*, 118*d* formed in the thickness of sole 112 and extending along the second axis 56. A first channel 118*a* and a second channel 118*b* are formed in the same first plane transverse to the first axis 54. A third channel 118*c* and a fourth channel 118*d* are formed in the same second plane transverse to the first axis 54. The first plane is located radially outside the second plane. The first channel 118*a* is connected to means 120 for supplying cooling water to the sole 112, the water then flows into the third channel 118*c*, then into the fourth channel 118*d* and finally into the second channel 118*b* and exits from one end of it. In this way, the sole 112 is cooled during operation to facilitate the test phases of the turbomachine.

It can be seen in FIGS. 10A, 10B, 11A and 11B that the first air cooling circuit 108 to be used without the first water cooling circuit 118 being used. To do this, simply do not insert the sole 112 between the housing 48 and the first circuit 108. Of course, the integration of the first water cooling circuit 118 makes it possible to further limit the heating of the device 48 according to the invention due, in particular, to the higher thermal conduction of water compared to air.

Figures 12A, 12B, 12C, 13:
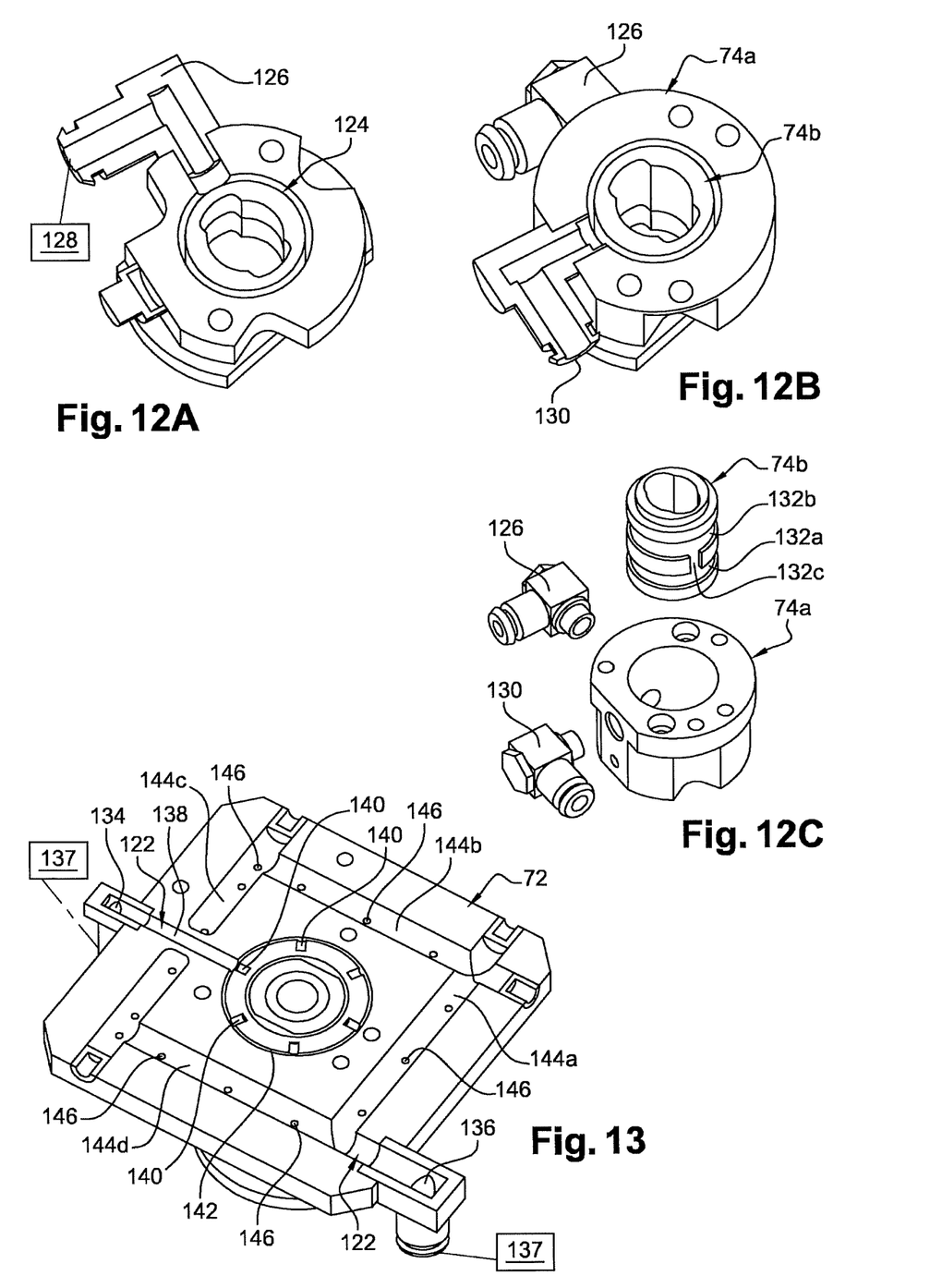
FIGS. 12A, 12B and 12C are schematic perspective views and according to different cross-sectional planes in radial direction of the liquid cooling medium.
FIG. 13 is a schematic perspective view of the means of cooling by air circulation of a support plate with radial translation of the measuring rod.

Device 46 also includes a second air cooling circuit 122 and a second liquid cooling circuit 124 such as water. The second water cooling circuit 124 is formed at the first 74*a* and second 74*b* tubular parts as can be seen in FIGS. 12A, 12B and 12C. The first tubular part 74*a* comprises a coolant inlet side nozzle 126 connected to a coolant supply means 128 and a liquid outlet side nozzle 130. The inlet nozzle 126 is placed below the outlet nozzle 128 to allow the liquid to flow from bottom to top. As can be seen in FIG. 12C, the second tubular part 74*b* comprises a lower annular recess 132*a* and an upper annular recess 132*b* connected to each other by axial grooves 132*c*. These recesses 132*a*, 132*b* and grooves 132*c* delimit with an inner face of the first tubular part 74*a* the circuit in which the coolant is able to circulate. Thus, coolant flows from inlet nozzle 126 into the lower annular recess 132*a*, then through grooves 132*c* and then into the upper annular recess 132*b* and out through the upper nozzle 130.

FIG. 13 shows the first stage 72 in a sectional plane perpendicular to the first axis 54. As can be seen, the first plate 72 carries a first air inlet nozzle 134 and a second air inlet nozzle 136 extending from opposite edges of the first plate 72 and each connected to air supply means 137. The first air inlet nipple 134 communicates with a connecting channel 138 with an annular groove 142 fluidly connecting bores 140 formed in the wall thickness of the first tubular part 74*a* and opening along the first axis 54 and upwards into the annular space between nipple 94 and stem 44. The second air inlet spigot 136 communicates with axial channels 144*a*, 144*b*, 144*c*, 144*d* connected to each other and together forming a square pattern. Drill holes 146 are formed in the thickness of the first plate 72 and open in a first direction from the first axis 54 on the underside of the first plate 72 and in a second direction in channels 144*a*, 144*b*, 144*c*, 144*d*. Thus, the air entering through the second nozzle 136 flows through channels 144*a*, 144*b*, 144*c*, 144*d* and cools the first plate 72 and exits through the holes 146.

In a particular embodiment of the device described above, the device could comprise only one or at least one of the first air cooling circuit 108, the first liquid cooling circuit 118, the second air cooling circuit 122, the second liquid cooling circuit or the second liquid cooling circuit 124.

The invention claimed is:

1. A device for measuring the characteristics of an air flow of an annular stream of a turbomachine, the device comprising:
 a rod extending along a first axis and carrying means for measuring the characteristics of an air flow and sealingly slidingly engaged in a first tubular part extending into a second tubular part passing sealingly along the first axis through a slider mounted slidingly in a slide along a second axis perpendicular to said first axis, said rod being engaged with an annular clearance in said second tubular part;
 wherein the first tubular part comprises a first support plate supporting, in rotation about the first axis, a first actuator for translational displacement of the rod along said first axis, the first support plate comprising a circuit capable of allowing air circulation and configured to be connected to air supply means.

2. The device according to claim 1, wherein the slider is cylindrical and comprises a first telescopic tube slider part and a second telescopic tube slider part, said first and second telescopic tube slider parts being sealingly attached at one axial end to said second tubular part.

3. The device according to claim 1, wherein a first tubular part and a second tubular part coaxial to the first axis are mounted around the rod, the first tubular part surrounding the second tubular part and delimiting with the latter a circuit capable of allowing a circulation of a cooling liquid which is configured to be connected to means for supplying cooling liquid.

4. The device according to claim 1, wherein the first tubular part is inserted into an opening of the first plate and is made integral with said first plate.

5. The device according to claim 3, wherein the first tubular part internally accommodates a guide tube in which the rod is slidably mounted in a close fit.

6. The device according to claim 5, wherein the guide tube comprises an annular flange clamped between an annular shoulder at a first end of the second tubular part and a clamping nut screwed to a second end of said second tubular part.

7. The device according to claim 6, wherein a seal is mounted around the rod and compressed along said first axis between two rings, said two rings and the seal being interposed between said annular flange of the guide tube and the nut.

8. The device according to claim 1, wherein the second tubular part is integral with a second plate mounted so as to be displaceable along the second axis by means of a rack and pinion system.

9. The device according to claim 1, further comprising a sole fixed to a face of the slide opposite that supporting the first tubular part, said sole comprising an opening through which the rod passes and a circuit capable of allowing a cooling liquid to circulate and configured to be connected to means for supplying a cooling fluid.

10. The device according to claim 1, wherein the slide comprises a circuit capable of allowing air circulation and configured to be connected to cooling air supply means.

11. An air flow duct for a turbomachine, the air flow duct comprising two coaxial inner and outer annular walls, and a device according to claim 1, the slide being fixed to a radially outer face of the outer annular wall and the rod passing through said outer annular wall so that its free end is arranged between said two inner and outer annular walls.

\* \* \* \* \*